United States Patent [19]
Cadiou

[11] 3,861,959
[45] Jan. 21, 1975

[54] BATTERIES COMPOSED OF FUEL CELLS
[75] Inventor: Jean Cadiou, Paris, France
[73] Assignee: S. A. Automobiles, Citroen, Paris, France
[22] Filed: Apr. 20, 1973
[21] Appl. No.: 353,008

[30] Foreign Application Priority Data
Apr. 27, 1972 France .............................. 72.15590

[52] U.S. Cl. ................................. 136/86 F, 136/14
[51] Int. Cl. ......................................... H01m 27/16
[58] Field of Search ...................... 136/86, 14, 153

[56] References Cited
UNITED STATES PATENTS

| | | | |
|---|---|---|---|
| 2,816,151 | 12/1957 | Ruben................................. | 136/153 |
| 3,083,252 | 3/1963 | Meyers ............................... | 136/153 |
| 3,250,645 | 5/1966 | Zahn et al............................. | 136/14 |
| 3,429,749 | 2/1969 | Kumano et al..................... | 136/86 F |
| 3,434,883 | 3/1969 | Babusei et al. ....................... | 136/14 |
| 3,460,991 | 8/1969 | White, Jr. .......................... | 136/86 R |
| 3,607,414 | 9/1971 | Kumans et al.................. | 136/153 X |

*Primary Examiner*—Allen B. Curtis
*Attorney, Agent, or Firm*—Eyre, Mann & Lucas

[57] ABSTRACT

A battery comprises a plurality of fuel cells which convert into electrical energy, chemical energy provided by the reaction of a gaseous fuel with a combustible gas. The cells are arranged in the form of a stack on a rod which extends through a central aperture in each cell. The axis of the rod constitutes the axis of symmetry of the battery.

17 Claims, 8 Drawing Figures

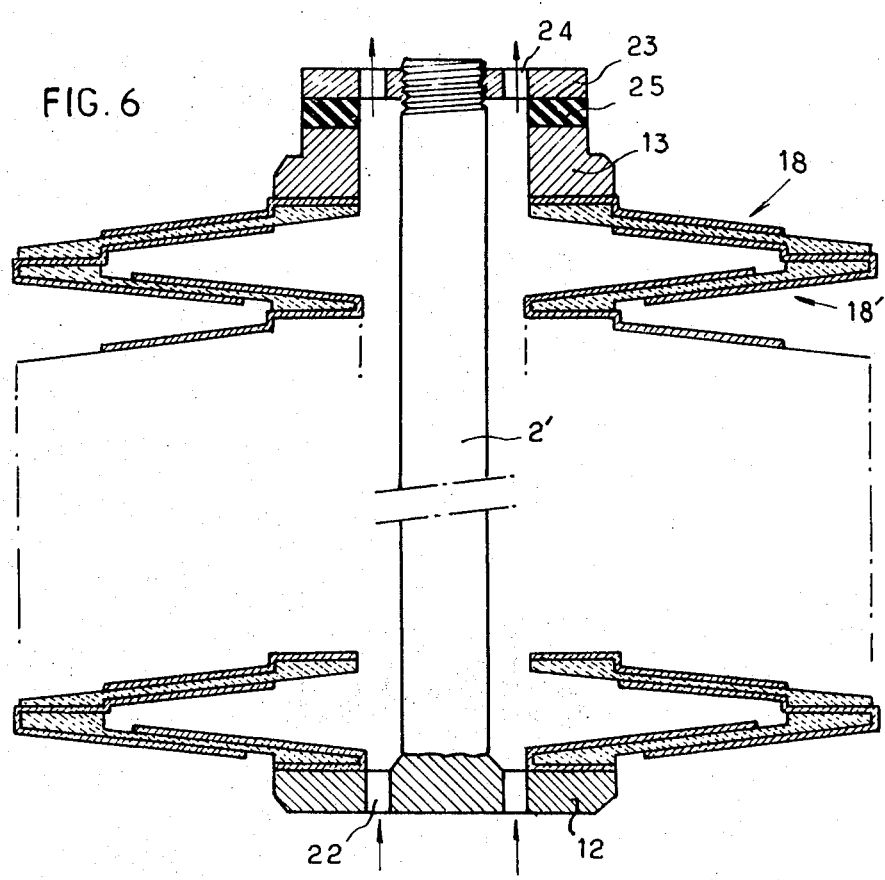
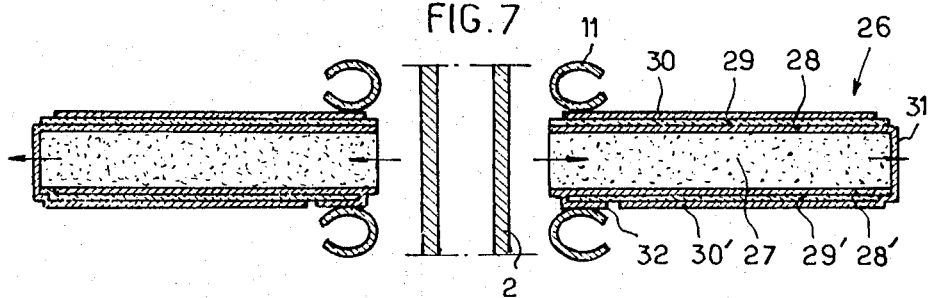
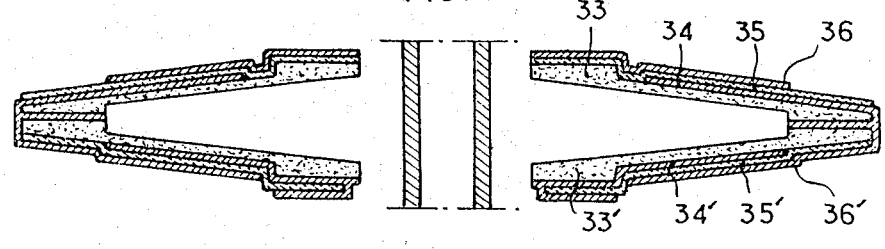

3,861,959

BATTERIES COMPOSED OF FUEL CELLS

BACKGROUND OF THE INVENTION

1. Field of the Invention.

The present invention relates to batteries composed of fuel cells.

2. Description of the Prior Art.

There has been proposed a fuel cell comprising a solid electrolyte in contact with two electrically conductive electrodes. Gaseous fuel, for example hydrogen, is applied to one of the electrodes while a combustible gas, for example oxygen or air, is applied to the other electrode. The oxygen ionises on its electrode, passes through the electrolyte in the form of a negative double-charge ion and reacts on the hydrogen, at the second electrode, forming water and at the same time giving off its electrons to the second electrode. The solid electrolyte consists of a ceramic composition, for example zirconium dioxide containing small quantities of ytterbium oxide or yttrium oxide to increase the conductivity of the oxygen ions.

The potential difference at the electrodes of the fuel cell is small and it is necessary to group them into batteries, by stacking them and maintaining them in an assembled state.

In previously proposed batteries composed of fuel cells, the cells are rigidly connected or are connected by means of a plurality of rods. The arrangement causes high localized stresses in the cells due to thermal deformation during operation of the battery.

SUMMARY OF THE INVENTION

According to the present invention, there is provided in a battery composed of fuel cells of the tube having a solid electrolyte and electrically conductive electrodes for the conversion into electrical energy of the chemical energy provided by the reaction of a gaseous fuel and a combustible gas, a stack of said fuel cells each having a central aperture, and a single supporting rod, the cells being assembled on the rod which extends through the central apertures of the cells, the axis of the rod being the axis of symmetry of the battery.

One of the ends of the duct defined by the central apertures can be connected to a source of combustible gas. In this case, the combustion products can escape to the atmosphere or, if the cells are connected in sealing engagement the combustion products can escape through the other end of the said duct whereby the gaseous fuel can be recirculated.

The electrolyte may be self-supporting or may be in a thin layer.

BRIEF DESCRIPTION OF THE DRAWINGS

Embodiments of the invention will now be described, by way of example only, with reference to the accompanying diagrammatic drawings, in which:

FIG. 6 is a longitudinal cross-section through a detail of an alternative embodiment;

FIG. 7 is a fragmentary section of another embodiment; and

FIG. 8 is a fragmentary section of another embodiment.

DESCRIPTION OF THE PREFERRED EMBODIMENTS

Figure 1:
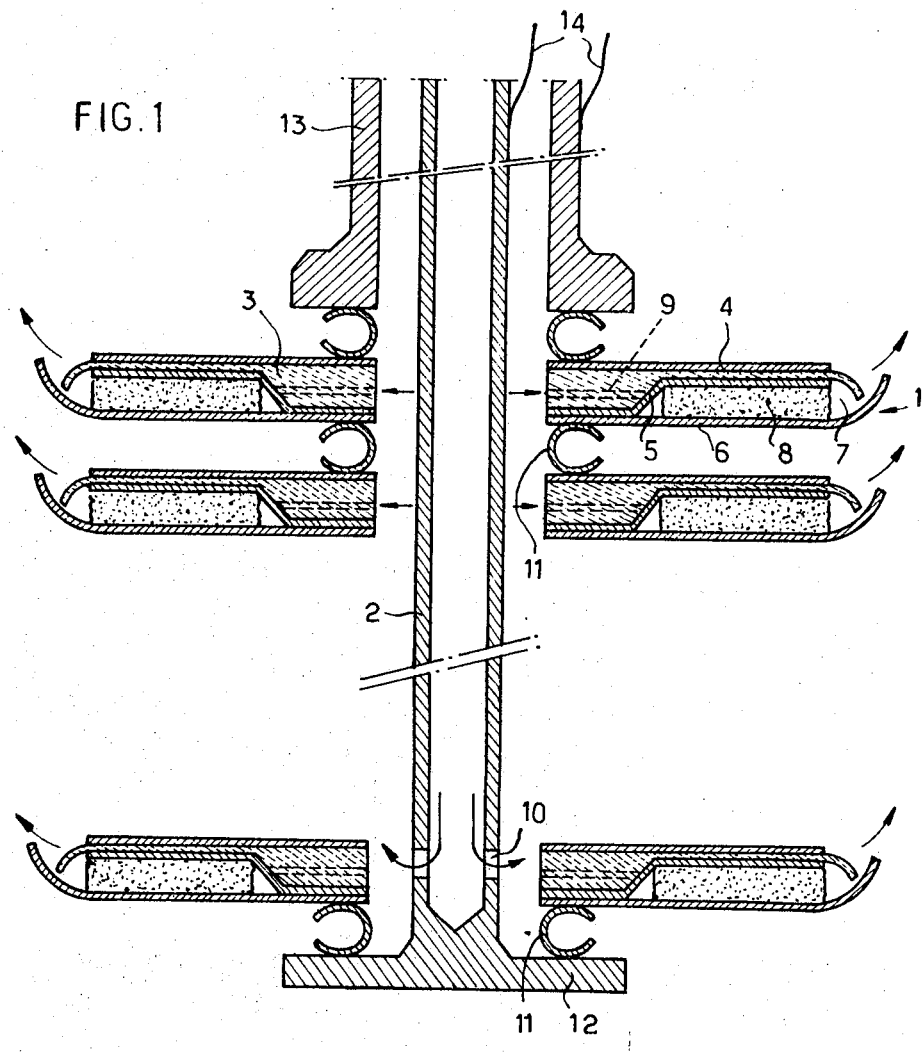
FIG. 1 is a longitudinal cross-section of a first embodiment of a battery in accordance with the invention.

The battery as shown in FIG. 1 comprises a series of cells 1 which are axially spaced along a central rod 2.

Each of the cells 1 comprises a plate 3 made from ceramic material, for example zirconium dioxide stabilised with yttrium oxide or ytterbium oxide, which constitutes the solid electrolyte and which carries on each side an electrode plate 4 or 5 respectively forming the cathode and the anode of the cell. The plate 3 has in its central portion, an aperture through which the rod 2 extends co-axially; the plate 3 can, for example, be annular or can be of square or other rectangular form. Disposed on the anode 5 is a conductive backing plate 6, of refractory metal for example, the plate 6 having an aperture in its central portion and being of the same shape as the plate 3.

The plate 3 has on the peripheral portion of that face which lies towards the backing plate 6, a recess which defines a space 7 in which a porous substance 8 is located. The plate 3 can be formed by sintering and comprises calibrated orifices 9 which create a pressure drop and which provide communication between the central space in the battery and the space 7.

The rod 2 is tubular and serves as an inlet duct for the gaseous fuel. At its lower end, the rod 2 has outlet holes 10.

In operation, the gaseous fuel is carried to the battery through the rod 2 and passes through the holes 10. It then flows radially towards the space 7 of each cell through the orifices 9 and escapes to the atmosphere when it has been oxidised. The porous substance 8 equalises the flow of fuel and avoids the risks of explosion by its explosion-proof action. Furthermore, it facilitates assembly of the two plates 4 and 6.

The various cells 1 are separated from one another by conductive separators 11 which ensure a gas-tight seal and electrical connection of the cathode 4 of one cell to the backing plate 6 of the adjacent cell; advantageously the separators 11 can be formed from resilient sealing washers of refractory metal.

The rod 2 carries an end plate 12 at its end opposite to that at which the gaseous fuel is fed into the rod, and the assembly of cells 1 is clamped between this end plate 12 and an opposed end plate 13 which is formed by the end surface of a sleeve which encloses the upper end portion of the rod 2. The plates 12 and 13 are connected to conductors 14. As will be apparent due to the action of the resilient separators 11, the cells are resiliently clamped between the plates 12 and 13.

Figure 2:
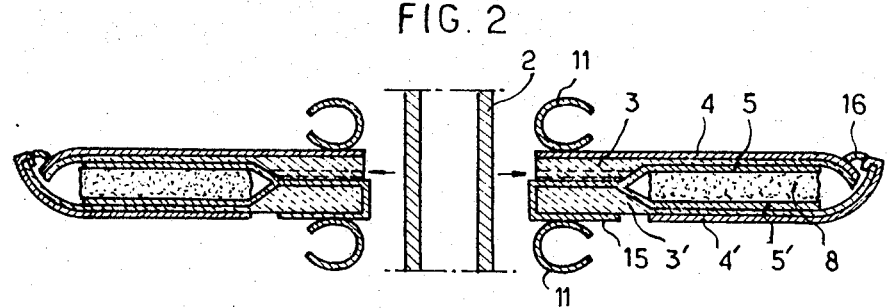
FIG. 2 is a fragmentary section of an alternative embodiment.
Figure 3:
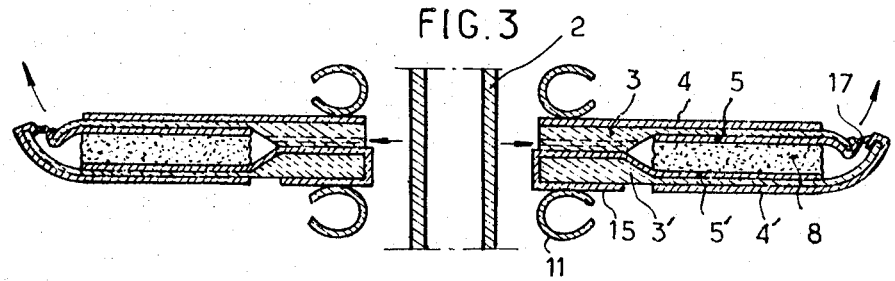
FIG. 3 is a fragmentary section of another alternative embodiment.

In the embodiments shown in FIGS. 2 and 3, the backing plate 6 is replaced by a plate 3' which forms the solid electrolyte and which carries electrode plates 4' and 5' which respectively form a cathode and an anode.

In FIG. 2, the two anodes 5 and 5' are in contact in their central portion and are electrically connected to a central annular electrode 15 disposed on the outer face of the plate 3'. The two cathodes 4 and 4' are electrically connected at points along their outer edges, as indicated at 16. The two cells thus formed by the solid electrolytes 1 and 1' and the electrodes 4 and 5 and 4' and 5' are therefore connected in parallel.

In FIG. 3, the anode 5 is electrically connected at points 17 to the cathode 4', and the anode 5' is electrically connected to the central electrode 15 whereby the two cells are connected in series.

Figure 4:
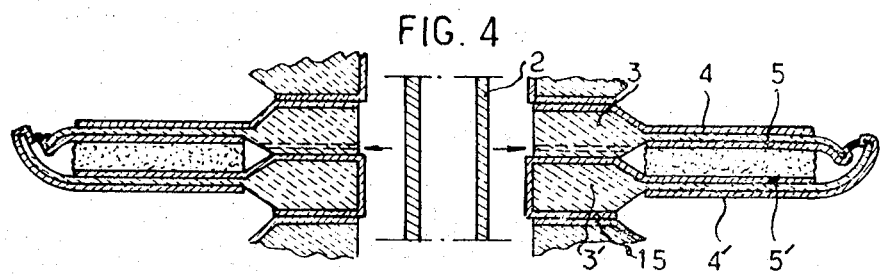
FIG. 4 is a fragmentary section of yet another alternative embodiment.

FIG. 4 shows an alternative arrangement of FIG. 3 in which the separators 11 are omitted, the central electrode 15 bearing directly against the electrode 4 of an adjacent set of cells. The porous substance 8 can also be omitted, the oppositely facing plates being solid and being spaced a few hundredths of a millimetre apart.

Figure 5:
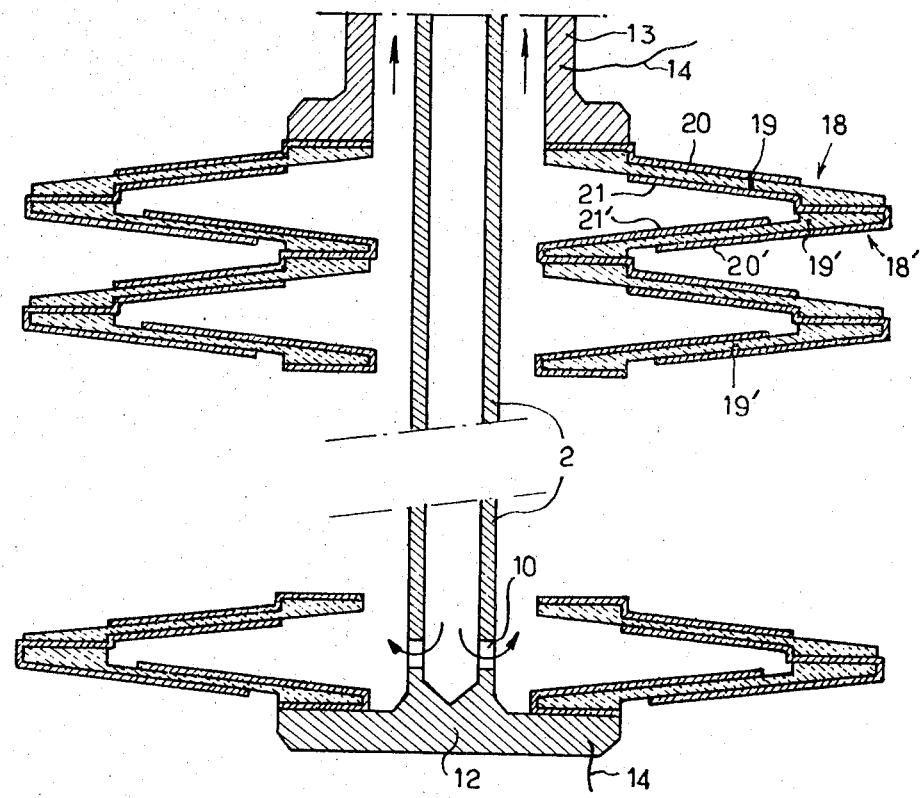
FIG. 5 is a longitudinal cross-section of another embodiment.

In the embodiment shown in FIG. 5, the battery comprises a series of cells 18 and 18' mounted on the rod 2 and clamped between the end plates 12 and 13, the cells being arranged so as to permit recirculation of gaseous fuel.

Each cell 18 or 18' comprises a disc 19 or 19' constituting the electrolyte and on which are disposed electrodes 20-21 and 20'-21', also in the form of discs, the electrodes 20-20' being cathodes, and the electrodes 21-21' being anodes. The discs 19 are inclined in one direction and the discs 19' are inclined in the opposite direction. The discs are connected alternately at their inner and their outer edge portion. This structure, in which the discs are preferably frustoconical, makes possible to derive maximum advantage from the elasticity of the electrolyte material during assembly by clamping.

Each anode 21 or 21' is connected to the cathode 20' or 20 of the cell which follows it. For this purpose, the contacting surface portions of the discs are machined and are joined, for example by diffusion welding when the contacting surface portions are metallised.

The discs 19 and 19' define a space insulated from the outside and the burned gas emerges through the annular space defined between the sleeve and the rod 2. The sleeve constitutes the positive terminal of the cell and the negative terminal is provided by the end plate 12.

In the embodiment shown in FIG. 6, the rod 2' does not serve as a duct for the supply of combustible gas. The end plate 12 has orifices 22 for the intake of gas and the upper end of the rod 2' is secured in a plate 23 having orifices 24 for the outlet of the burned gas. The plate 23 bears against the end plate 13 through an insulating disc 25.

The electrolyte of each cell may be provided in a thin layer, that is to say it may be a few microns in thickness, being produced by evaporation under a vacuum or by deposition in a vapour phase.

In FIG. 7, a cell assembly 26 comprises two cells connected in series; a plurality of assemblies 26 can be used in the manner shown in FIG. 1 to form a battery. The cell assembly 26 comprises a porous support disc 27 made from insulating material, which is pierced in its centre and which carries on each of its faces a cell constituted by an anode 28 or 28', a thin electrolyte 29 or 29' and a cathode 30 or 30', the anode being externally connected to the cathode 30', as indicated at 31, and the anode 28' being connected to an annular central electrode 32. The electrolytes 29 and 29' are gas tight while the electrodes are porous.

The support 27 can be made from a conductive material with an insulating coating on its axial faces.

The cell assembly 26 can be replaced by a simple cell or by a cell assembly comprising two cells connected in parallel. In this latter case, the porous support 27 can be made from a conductive material and can constitute the anode.

The embodiment shown in FIG. 8 is similar to that shown in FIG. 5, but has an electrode in the form of a thin layer. Each cell comprises a porous frustoconical support disc 33 or 33', the shape of which is similar to that of the disc 19 or 19', and which is externally coated by, in succession, an anode 34 or 34', a thin gas tight electrolyte 35 or 35' and a cathode 36 or 36'. The electrodes are connected as shown in FIG. 5. The outer edge of the frustoconical disc 33 or 33' is rendered gas tight so as to prevent any leakage between the anode compartment and the atmosphere.

The batteries particularly described will not be damaged at temperatures of the order of 800°C, this being the order of temperature at which the batteries will operate. In each battery, electrical contact between the individual cells is effected without the use of wires, the contact being established automatically during the assembly of the battery. Further, a circuit provided for circulation of gases is provided automatically at the time of assembly.

The structure of the batteries described permits a balanced distribution of thermal deformation and obviates localised stresses.

What is claimed is:

1. In a battery composed of fuel cells of the type having a solid electrolyte and electrically conductive electrodes for the conversion into electrical energy of the chemical energy provided by the reaction of a gaseous fuel and a combustible gas,
    a stack of said fuel cells each having a central aperture, and
    a single supporting rod, the cells being assembled on the rod which extends through the central apertures of the cells, the axis of the rod being the axis of symmetry of the battery, and
    wherein each said cell has plane support-surfaces surrounding the central aperture, the cells being supported by their said plane surfaces, and the said plane surfaces are electrically conductive whereby the cells are connected in series, and
    further comprising conductive separator means, the separator means being interposed between the plane surfaces of adjacent cells, and
    wherein the separator means is in the form of a resilient seal.

2. A battery according to claim 1, wherein the cells are annular.

3. A battery according to claim 1, wherein the central apertures of the cells define a duct in communication with a source of gaseous fuel and the combustion products flow towards the periphery of the cells.

4. A battery according to claim 1, wherein each cell comprises
    a porous support, an electrolyte in the form of a thin layer carried by the support, and
    two electrodes, the electrolyte being interposed between the electrodes.

5. A battery according to claim 4, wherein the battery is composed of a plurality of groups of cells, each said group consisting of two cells, and the respective cells in each group having a said porous support of the same porous substance.

6. In a battery composed of fuel cells of the type having a solid electrolyte and electrically conductive electrodes for the conversion into electrical energy of the chemical energy provided by the reaction of a gaseous fuel and a combustible gas,
 a stack of said fuel cells each having a central aperture, and
 a single supporting rod, the cells being assembled on the rod which extends through the central apertures of the cells, the axis of the rod being the axis of symmetry of the battery, and
 wherein each said cell has plane support-surfaces surrounding the central aperture, the cells being supported by their said plane surfaces, and the said plane surfaces are electrically conductive whereby the cells are connected in series, and
 further comprising conductive separator means, the separator means being interposed between the plane surfaces of adjacent groups of cells, and
 wherein the separator means is in the form of a resilient seal.

7. In a battery composed of fuel cells of the type having a solid electrolyte and electrically conductive electrodes for the conversion into electrical energy of the chemical energy provided by the reaction of a gaseous fuel and a combustible gas,
 a stack of said fuel cells each having a central aperture, and
 a single supporting rod, the cells being assembled on the rod which extends through the central apertures of the cells, the axis of the rod being the axis of symmetry of the battery, and
 wherein the cells are connected in sealing engagement alternately at their outer edge portion and at their inner edge portion.

8. A battery according to claim 7, wherein each cell is in the form of a frusto-conical disc.

9. A battery according to claim 7, wherein the seal is provided by contact between adjacent cells whereby the cells are electrically connected.

10. A battery according to claim 7, wherein the seal is provided by a continuous weld around an edge portion of adjacent cells whereby the cells are electrically connected.

11. A battery according to claim 7, wherein the central apertures of the cells define a duct, one end of the duct being connected to a source of gaseous fuel and the other end of the duct being connected to a duct through which the products of combustion are evacuated.

12. In a battery composed of fuel cells of the type having a solid electrolyte and electrically conductive electrodes for the conversion into electrical energy of the chemical energy provided by the reaction of a gaseous fuel and a combustible gas,
 a stack of said fuel cells each having a central aperture, and
 a single supporting rod, the cells being assembled on the rod which extends through the central apertures of the cells, the axis of the rod being the axis of symmetry of the battery, and
 wherein each said cell has plane support-surfaces surrounding the central aperture, the cells being supported by their said plane surfaces, and the said plane surfaces are electrically conductive whereby the cells are connected in series, and
 wherein the cells have a greater thickness in the region of their support surfaces than at their periphery, and
 wherein each cell comprises
 a backing plate,
 a solid electrolyte plate having plane faces, one of said faces being directed towards the backing plate, the said face having a peripheral recess whereby a space is defined between the periphery of the electrolyte plate and that of the backing plate, and
 an electrode on each said face of the electrolyte plate.

13. A battery according to claim 12, further comprising
 a porous substance within the said space.

14. In a battery composed of fuel cells of the type having a solid electrolyte and electrically conductive electrodes for the conversion into electrical energy of the chemical energy provided by the reaction of a gaseous fuel and a combustible gas,
 a stack of said fuel cells each having a central aperture, and
 a single supporting rod, the cells being assembled on the rod which extends through the central apertures of the cells, the axis of the rod being the axis of symmetry of the battery, and
 wherein each said cell has plane support-surfaces surrounding the central aperture, the cells being supported by their said plane surfaces, and the said plane surfaces are electrically conductive whereby the cells are connected in series, and
 wherein the cells have a greater thickness in the region of their support surfaces than at their periphery, and
 wherein the battery is composed of a plurality of groups of cells, each group consisting of two cells, each said cell comprising
 a solid electrolyte plate having plane faces, and
 an electrode on the said plane faces, the electrolyte plate having a peripheral recess on that face thereof which is directed towards the electrolyte plate of the other cell of the group whereby a space is formed between the periphery of the two plates.

15. A battery according to claim 14, further comprising
 a porous substance located in the said space.

16. In a battery composed of fuel cells of the type having a solid electrolyte and electrically conductive electrodes for the conversion into electrical energy of the chemical energy provided by the reaction of a gaseous fuel and a combustible gas,
 a stack of said fuel cells each having a central aperture, and
 a single supporting rod, the cells being assembled on the rod which extends through the central apertures of the cells, the axis of the rod being the axis of symmetry of the battery, and
 wherein each said cell has plane support-surfaces surrounding the central aperture, the cells being supported by their said plane surfaces, and the said plane surfaces are electrically conductive whereby the cells are connected in series, and
 wherein the said rod comprises an annular support surface in contact with the adjacent support surface of the adjacent cell at one end of the stack, the said battery further comprising a clamping member having a bearing surface in contact with the cell at the other end of the stack, the clamping member being co-axial with the rod, being electrically insulated from the rod, and being operative to maintain the rod in tension.

17. In a battery composed of fuel cells of the type having a solid electrolyte and electrically conductive electrodes for the conversion into electrical energy of the chemical energy provided by the reaction of a gaseous fuel and a combustible gas, a stack of said fuel cells each having a central aperture, and a single supporting rod, the cells being assembled on the rod which extends through the central apertures of the cells, the axis of the rod being the axis of symmetry of the battery, and wherein the rod is tubular and is connected to a source of gaseous fuel, the rod containing apertures through which gaseous fuel is discharged internally of the stack.

* * * * *